Oct. 20, 1959     B. E. PLATT     2,909,710
MOUNTING FOR ELECTRICAL APPARATUS

Filed Nov. 27, 1957

INVENTOR.
BLAINE E. PLATT
BY
Carl H. Synnestvedt
AGENT

United States Patent Office 2,909,710
Patented Oct. 20, 1959

2,909,710

MOUNTING FOR ELECTRICAL APPARATUS

Blaine E. Platt, Philadelphia, Pa., assignor to Philco Corporation, Philadelphia, Pa., a corporation of Pennsylvania Application November 27, 1957, Serial No. 699,319

3 Claims. (Cl. 317—101)

The present invention has to do with electrical apparatus and, more particularly, with means for mounting such apparatus.

Unitary assemblies of the panel-mounted variety have, in recent years, become increasingly popular in the fields of electrical apparatus. Such panel mounted units generally comprise panel means upon which are mounted electrical component assemblies, or sub-assemblies, the panel means being constructed and arranged for mounting upon suitable frame structure, such for example as the metal chassis of a radio or television receiving set. The aforementioned panel means often takes the form of the so-called "printed wiring" panel structure, which is characterized by somewhat exposed electrical circuit components such as lead wires and terminals mounted upon a sheet-like insulating panel. It is at times desirable that certain of the electrical circuit components be connected to a grounded chassis structure upon which the panel is mounted. However, difficulties have been encountered in providing ground connections of this type by heretofore known means, generally comprising relatively complicated, individual coupling means.

It is, therefore, a primary object of this invention to provide simple connecting means overcoming the aforementioned difficulties, and characterized by providing both physical support and electrical connection for the panel.

It is another object of the present invention to provide an improved arrangement for establishing connections which eliminates the use of specially provided means such as clips, binding posts, clamps, and other similar connectors.

A characteristic feature of the invention resides in the provision of mounting means of the foregoing variety which is of a somewhat resilient nature, thereby absorbing stresses to which the relatively fragile panels are subjected, such for example as stresses due to impacts in shipment, as well as differential thermal expansion of the panel with respect to a metal chassis.

In achievement of the foregoing and other objectives, a preferred embodiment of the present invention comprises sheet-like frame structure of electrically conductive material having tab means extending away from said frame structure, said tab means further having shoulder portions constructed and arranged to support a wiring panel of electrically insulating material having apertures disposed in registry with said tab means. Portions of the panel resting upon said shoulder portions of the tabs, space the panel from the frame, and outwardly presented lug means are disposed in electrical contact with circuitry carried by the panel, adjacent the apertures in the latter, and are bent into registry with the tab means for permanent attachment thereto, whereby to effect grounding or other electrical connection. It is preferable that the tab means be bifurcated, and that the lug means extend between the bifurcations thereof.

It is an additional feature of the present invention that the disclosed novel mounting means accommodates limited relative movement between a wiring panel and its supporting structure, while providing sufficiently rigid support of the panel.

The manner in which the foregoing and other objectives of the present invention may best be achieved will be understood by referring to the following written description, taken in conjunction with the accompanying drawing, wherein.

Figure 1:
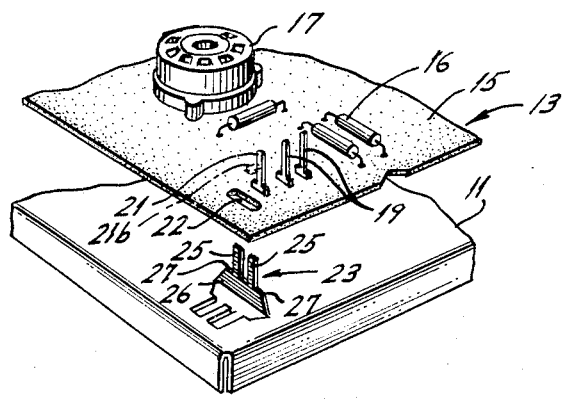
Figure 1 is a fragmentary exploded view, in perspective, of apparatus embodying the present invention.
Figure 2:
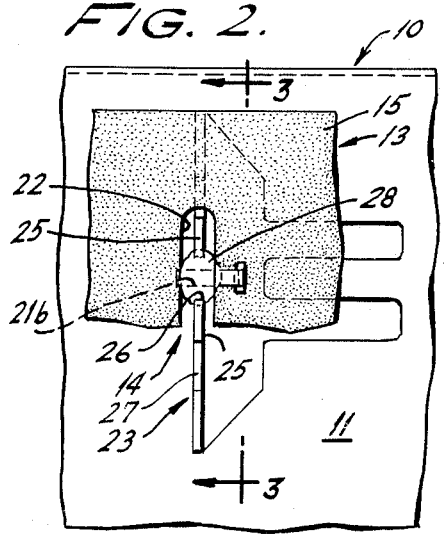
Figure 2 is a fragmentary plan view, on a somewhat enlarged scale, of an assembly comprising apparatus of the kind shown in Figure 1.

Now having more particular reference to the drawing, and first to Figures 1 and 2 thereof, an electrical assembly 10 comprises sheet-like electrically conductive plate means 11, which in the preferred embodiment may be the metal chassis of a radio or television receiver. An electrical component panel-carried sub-assembly 13 is supported in electrical contact with the metal chassis, by novel mounting means 14, to be hereinafter more fully described. The electrical component sub-assembly 13 comprises a suitable sheet-like panel 15 of insulating material, said panel having affixed thereto various electrical components such as a resistor 16 and a tube socket 17. These components are electrically connected to one another by suitable circuit means of the so-called "printed" type disposed on the side of the insulating panel opposite the aforementioned electrical components, as best seen at 20 in Figures 3, 4 and 5. Suitable terminals for circuit means 20 include vertically extending, slender, rod-like lug means 19 (Figure 1) each being adapted electrically to engage wire means (not shown) wrapped around or soldered to the lug, as is known.

Figure 5:
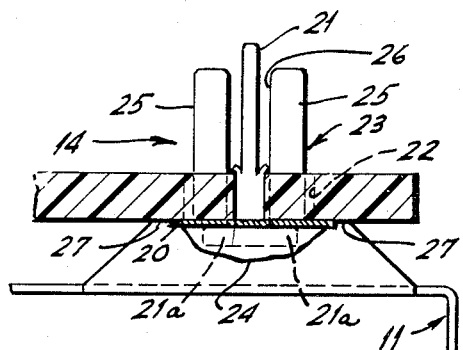
Figure 5 is a view similar to Figure 3, and showing a step in the assembly of the apparatus.
Figure 3:
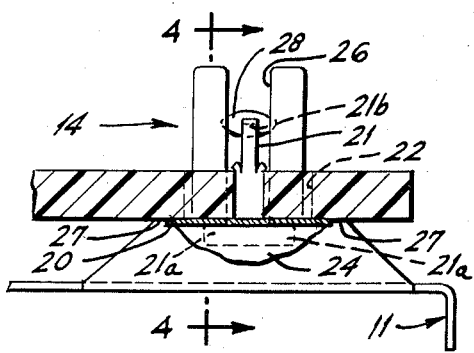
Figure 3 is a sectional view, in elevation, and looking in the direction 3—3 of Figure 2.
Figure 4:
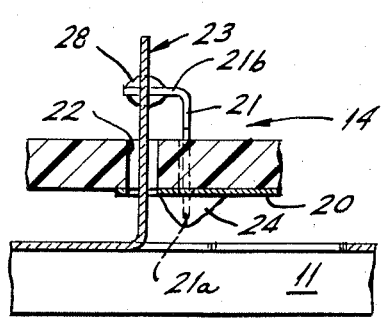
Figure 4 is a sectional view looking generally in the direction 4—4 of Figure 3.

In particular accordance with the present invention additional lug means 21 is provided, this additional means having a turned, or bendable, portion 21b. Referring to Figure 2, and also to Figures 3 and 4, it will be seen that lug means 21, 21b is disposed adjacent an aperture 22 formed in panel 15. As best seen in Figure 5, lug means 21, prior to bending, has the general configuration of an inverted T, and horizontal portions 21a of the lug are disposed in electrical contact, by solder 24, with the printed wiring carried by the panel. As shown in Figures 2 and 4, lug means 21 extends upwardly through the panel 15, and turned portion 21b extends laterally into mounting engagement with tab 23; for example, lug portion 21b extends through a slot 26 in tab 23, said slot being defined by bifurcations or prongs 25 extending upwardly through the aperture 22. Tab 23 preferably is struck from the metal chassis 11, and bent upwardly to the position shown. As best seen in Figures 1, 3 and 5, shoulder portions 27 of the tab 23 extend transverse the bifurcations 25, and are constructed and arranged to engage the panel 15 and space the panel from the chassis 11. Whereas in the accompanying drawing, because of the plane of the various sections, it might appear that the shoulders 27 of the tab 23 are bearing against the panel through the intermediation of the applied circuit conductors 20, in actuality, in the illustrated embodiment the applied circuitry is stopped short of the tab and the tab bears directly against the undersurface of the panel. It will be understood however, that since the circuitry 20 is electrically connected to the chassis by the above described securement of lug 21 to tabs 23, contact of the tab shoulders with the circuitry would introduce no difficulty. It has been found advantageous to provide one such mounting means 14 at each corner and at the center of a generally rectangular insulating panel 15.

While the novel mounting means provides sufficiently rigid support of a component panel, as well as effecting electrical connection to the chassis, the resilient nature of the lug means 21 in cooperation with the clearance fit of aperture 22 about tab 23, will advantageously absorb stresses set up in the assembly. Such stresses, as mentioned above, may result from differential thermal expansions of the metal chassis 11 with respect to the plastic sheet 15, as well as stresses due to impact, such as encountered while handling.

To mount component sub-assembly 13 upon chassis 11, each aperture 22 is positioned in registry with prongs 25 of upstanding tabs 23 (see Figures 1 and 5), and the insulating panel is brought into engagement with shoulders 27 of the tabs, followed by inserting turned portions 21b of lug means 21 into slots 26 and applying solder, as seen at 28, to the junctions of lug means 21 with prongs 25. Although for the purposes of illustration, a substantial clearance is shown between lug means 21 and the prongs 25 defining slot 26, it is to be understood that lug means 21 and slots 26 may, to advantage, be configured to provide slight frictional engagement of the lug means with prongs 25, thereby affording sufficient rigidity to a mounted panel to prevent its disengagement from the chassis prior to applying solder 28.

Thus, novel means is provided for accommodating both electrical and mounting engagement of a wiring panel upon a chassis. It is also seen that the mounting means hereinbefore described ensures optimum spacing and rigidity of a wiring panel with respect to the supporting chassis, thereby advantageously preventing contact of particular portions of the electrical circuitry carried by the panel with the electrically conductive chassis.

While the present invention has been demonstrated in but a single preferred embodiment, it is to be understood that the novel mounting means is susceptible to modifications falling within the scope of the appended claims. For example, electrical circuitry of the panel may be in the form of conventional insulated wire. Also, the tab means may be formed separately from the chassis, and attached to the latter by known suitable means.

I claim:

1. In combination with an electrically insulative circuit-carrying panel and underlying chassis structure with which said panel is associated, means for resiliently supporting said panel in position spaced above said chassis structure, and for electrically connecting the panel-carried circuitry with said chassis structure, said means comprising: a plurality of metallic tab members fixed to said chassis structure and projecting therefrom toward said panel, each said tab member having a shoulder portion against which said panel bears and a connection portion extending freely through a registering aperture provided in said panel; and a plurality of slender metallic lug elements each including a portion electrically and mechanically connected to the panel-carried circuitry and a flexible rod-like portion projecting from said panel toward and terminating in electrically conductive panel-attaching engagement with that portion of an associated tab member which extends through said panel.

2. In combination with an electrically insulative circuit-carrying panel and confronting chassis structure with which said panel is associated, means for resiliently supporting said panel in position spaced from said chassis structure, and for electrically connecting the panel-carried circuitry with said chassis structure, said means comprising: a plurality of metallic tab members fixed to said chassis structure and projecting therefrom toward said panel, each said tab member having a shoulder portion against which said panel bears in an area free of circuitry, and a connection portion extending freely through a registering aperture provided in said panel; and a plurality of slender metallic lug elements each including a portion electrically and mechanically connected to the panel-carried circuitry and a flexible rod-like portion projecting from said panel toward and terminating in electrically conductive, panel-attaching engagement with that portion of an associated tab member which extends through said panel.

3. A combination in accordance with claim 2, and further characterized in that the mentioned circuitry is carried by the surface of said panel which is disposed in confronting relation with said chassis structure, and said lug elements include a head section bearing against the circuitry in electrical and mechanical connection therewith, and said flexible rod-like portion of each lug element extends from said head section through the panel and to the mentioned point of conductive engagement with the connection portion of the associated tab member.

References Cited in the file of this patent

UNITED STATES PATENTS

| | | |
|---|---|---|
| 2,542,793 | Brenta | Feb. 20, 1951 |
| 2,677,769 | Fathauer | May 4, 1954 |
| 2,825,010 | Silverschotz | Feb. 25, 1958 |